United States Patent [19]
Dykstra et al.

[11] Patent Number: 5,605,130
[45] Date of Patent: Feb. 25, 1997

[54] ELECTRONIC GOVERNOR HAVING INCREASED DROOP AT LOWER SELECTED SPEEDS

[75] Inventors: Richard A. Dykstra, Cedar Grove; Robert K. Mitchell, Brookfield, both of Wis.

[73] Assignee: Briggs & Stratton Corporation, Wauwatosa, Wis.

[21] Appl. No.: 630,871

[22] Filed: Apr. 2, 1996

Related U.S. Application Data

[63] Continuation-in-part of Ser. No. 228,288, Apr. 15, 1994, Pat. No. 5,524,588.

[51] Int. Cl.⁶ .................................................. F02D 41/00
[52] U.S. Cl. ............................................................ 123/361
[58] Field of Search ........................... 123/361, 399, 123/350, 351, 352, 353, 357; 180/176, 179

[56] References Cited

U.S. PATENT DOCUMENTS

| | | | |
|---|---|---|---|
| 3,651,793 | 3/1972 | Roth et al. | 123/361 |
| 3,722,614 | 3/1973 | Sakakibara et al. | 123/361 |
| 3,738,340 | 6/1973 | Olson | 123/361 |
| 3,884,203 | 5/1975 | Cliffgard | 123/361 |
| 3,914,619 | 10/1975 | Talmage et al. | 307/129 |
| 4,034,725 | 7/1977 | Ito et al. | 123/361 |
| 4,105,935 | 8/1978 | Arai et al. | 318/314 |
| 4,252,095 | 2/1981 | Jaulmes | 123/329 |
| 4,286,685 | 9/1981 | Rudolph et al. | 180/176 |
| 4,385,601 | 5/1983 | Orova et al. | 123/335 |
| 4,403,970 | 9/1983 | Dretzka et al. | 440/75 |
| 4,462,356 | 7/1984 | Hirt | 123/335 |
| 4,475,503 | 10/1984 | Nakamura et al. | 123/339 |
| 4,640,246 | 2/1987 | Sturdy | 123/350 |
| 4,875,448 | 10/1989 | Dykstra | 123/352 |
| 4,884,541 | 12/1989 | Marriott | 123/361 |
| 4,885,692 | 12/1989 | Kurihara et al. | 364/426.04 |
| 4,936,274 | 6/1990 | Kozlov et al. | 123/350 |
| 4,947,813 | 8/1990 | Vainshtein et al. | 123/352 |
| 4,977,877 | 12/1990 | Dykstra | 123/335 |
| 5,038,879 | 8/1991 | Naito et al. | 180/179 |
| 5,085,286 | 2/1992 | Danzaki et al. | 180/179 |
| 5,113,823 | 5/1992 | Iriyama | 123/399 |
| 5,323,746 | 6/1994 | Best et al. | 123/357 |
| 5,452,697 | 9/1995 | Sasaki et al. | 123/399 |
| 5,524,588 | 6/1996 | Dykstra et al. | 123/353 |

FOREIGN PATENT DOCUMENTS

| | | | |
|---|---|---|---|
| 0005994 | 12/1979 | European Pat. Off. | 123/361 |
| 0178058 | 4/1986 | European Pat. Off. | 123/361 |
| 1563857 | 10/1977 | Germany | 123/361 |
| 2751213 | 5/1979 | Germany | 123/361 |
| 3103928 | 9/1982 | Germany | 123/361 |
| 57-73842 | 5/1982 | Japan | 123/361 |

*Primary Examiner*—Raymond A. Nelli
*Attorney, Agent, or Firm*—Michael, Best & Friedrich

[57] ABSTRACT

The low cost speed governor is used to provide stable device speed over a wide range of selected reference speeds and loads. The speed governor includes a means for changing the pulse width of a pulsed reference signal as a function of the selected reference speed and the load applied to the device. Operational stability is achieved at low reference speeds by automatically increasing the speed droop as the selected reference speed is lowered and as the applied load is increased. Overall governor cost is reduced by an arrangement that uses the same potentiometer to both vary the selected reference speed and to automatically change the speed droop.

25 Claims, 4 Drawing Sheets

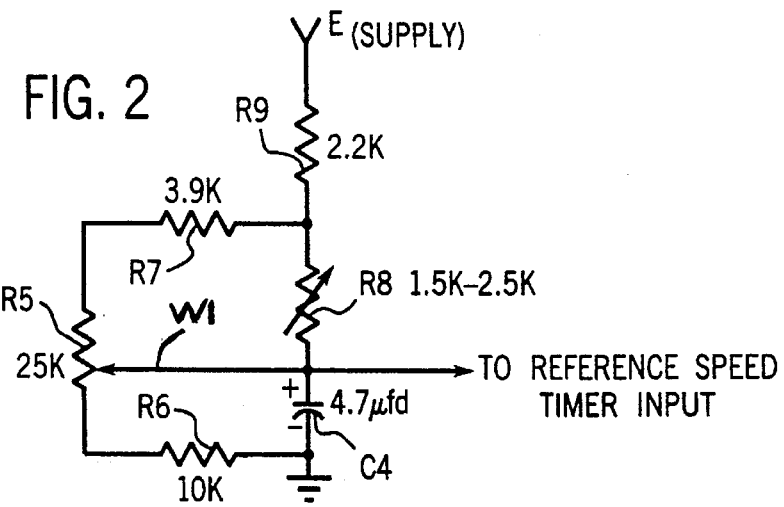
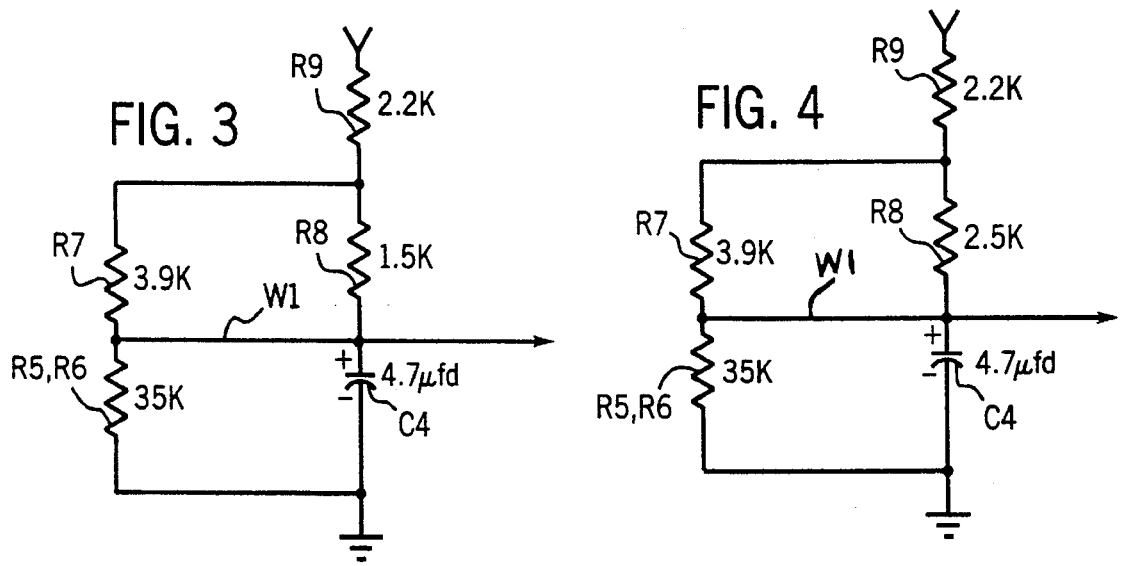
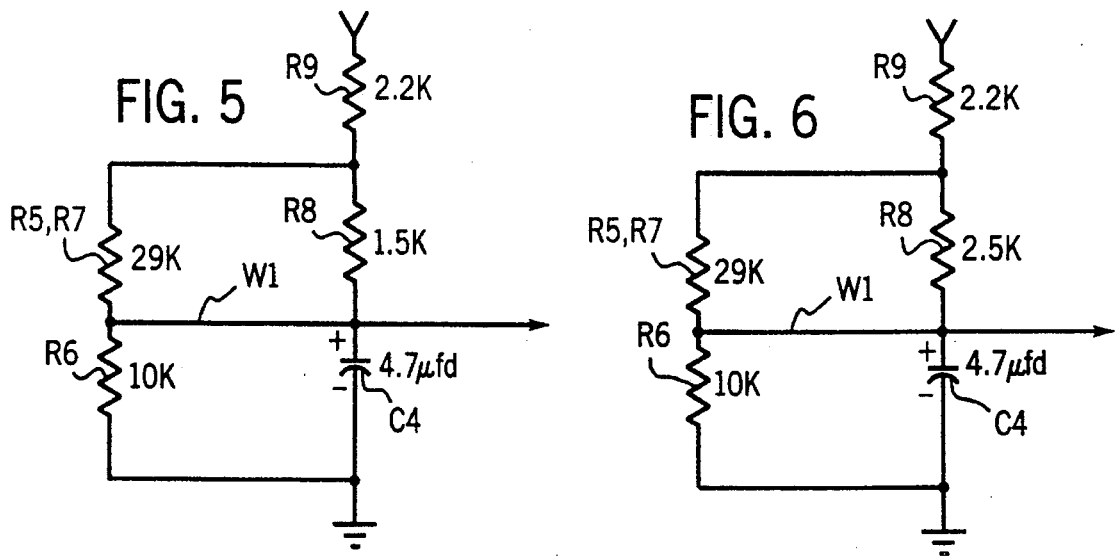

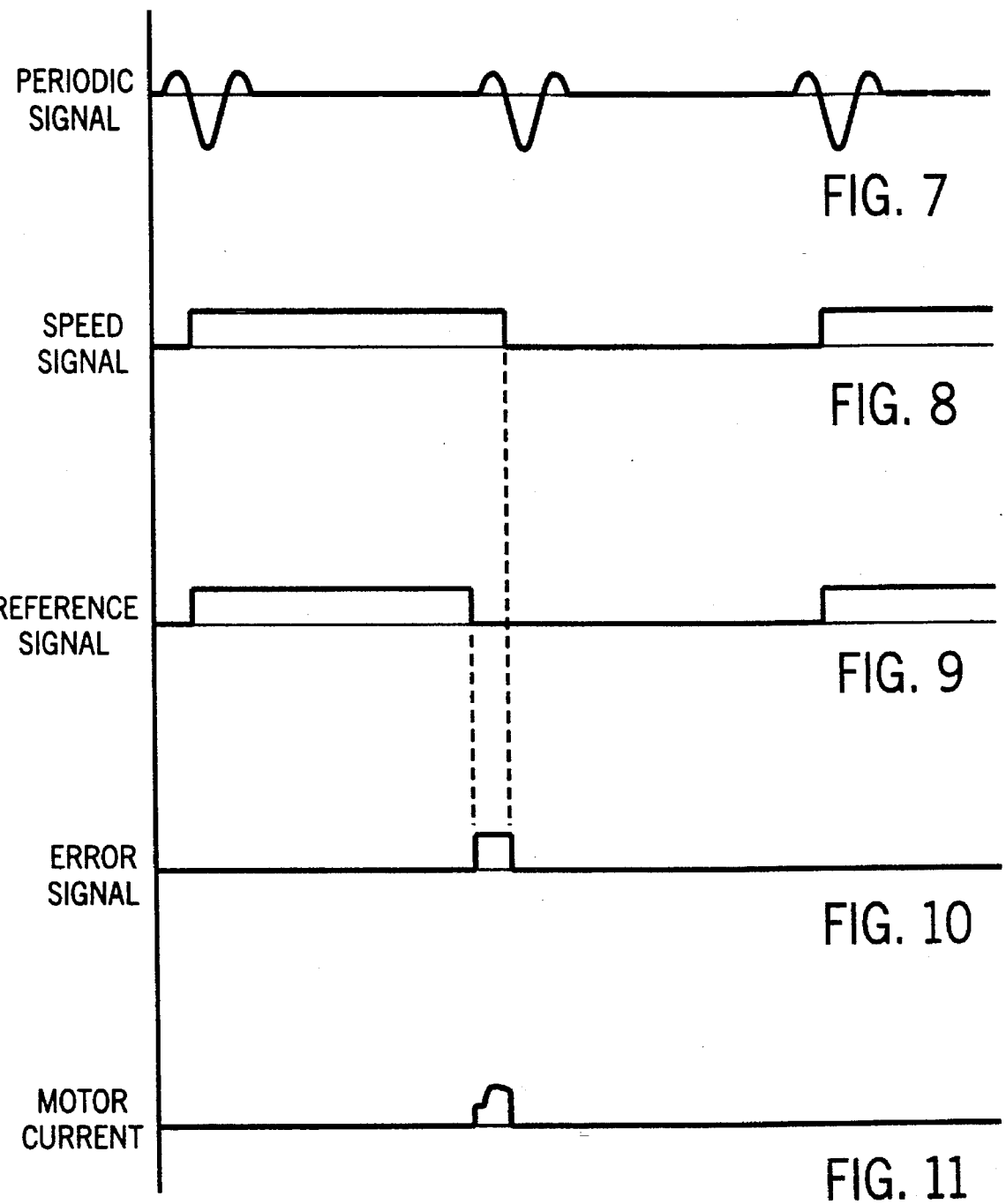

ated April 15, 1994.

ELECTRONIC GOVERNOR HAVING INCREASED DROOP AT LOWER SELECTED SPEEDS

BACKGROUND OF THE INVENTION

This Application is a continuation-in-part of Ser. No. 08/228,288 filed Apr. 15, 1994, U.S. Pat. No. 5,524,588 issued 11 Jun. 1996.

This invention relates to speed governors for power producing and absorbing devices, such as internal combustion engines. More particularly, this invention relates to electronic speed governors for small engines like those used on lawn mowers, snow blowers, generators and the like.

Automatic devices that cause power producing and absorbing machines to operate near a reference speed are well known in the art. Such automatic devices are commonly referred to as "speed governors." Typically, such speed governors are either of the mechanical type or of the electronic type.

Various types of mechanical governors are well known in the art. However, such governors are often bulky, contain numerous moving parts, and are expensive.

Many types of electronic speed governors are also well known in the art. Such electronic devices permit more accurate control of engine speed, but often contain many semiconductor components that increase the cost of the governor.

U.S. patent application Ser. No. 08/228,288 filed Apr. 15, 1994 discloses a low cost electronic governor in which the engine speed is allowed to vary within a speed band before the electronic governor corrects the engine speed.

The speed governor disclosed in the above-referenced patent application was not intended for use in applications requiring a broad operating speed range or for applications requiring a low governed idle speed. The speed band in the above-referenced prior speed governor inherently becomes narrower as the reference speed is reduced. This occurs because a given pulse width error signal will be generated with a smaller engine speed difference at low speeds than at high speeds. For example, assuming a reference speed of 3200 rpm, a one millisecond error signal will occur when the actual engine speed varies from the engine reference speed by approximately 160 rpm. Assuming the threshold value for changing the engine speed is slightly less than one millisecond, then the speed band is approximately 320 rpm when the reference speed is 3200 rpm. With a reference speed of 1600 rpm, however, the same one millisecond error signal pulse width will occur when the actual speed varies from the reference speed by only about 40 rpm. If the same threshold value is used, the speed band corresponding to a reference speed of 1600 rpm is only about 80 rpm.

The reduced speed band at lower engine speeds, when combined with reduced inertia of the system components at lower speeds, makes no-load and light-load governing at low engine speeds somewhat difficult. With a narrower speed band, frequent speed oscillations and speed corrections may occur under light or no-load conditions at reduced engine speed using the invention disclosed in U.S. patent application Ser. No. 08/228,288.

Therefore, it is desirable to provide a low cost electronic governor which will enable stable engine operation at a wide variety of engine speeds and loads.

SUMMARY OF THE INVENTION

A low cost electronic speed governor is disclosed which provides stable engine operation at a variety of selectable reference speeds and engine loads. Stable operation at lower reference speeds is achieved by increasing the speed droop at lower reference speeds. The speed droop is also increased as the applied load is increased. In a preferred embodiment, a single potentiometer is used to simultaneously vary the reference speed and to vary the speed droop, thereby reducing the cost of the electronic governor.

The speed governor comprises an input means for receiving a periodic signal indicative of the actual speed of the device, a first means for generating a pulsed speed signal that is functionally related to the periodic signal, the pulsed speed signal preferably having a pulse width that is functionally related to the actual device speed. The speed governor also includes a second means for generating a pulsed reference signal preferably having a pulse width that is functionally related to a selected reference speed. The second generating means includes a means for selecting the reference speed, a means for reducing the reference speed by a speed droop to yield a new reference speed when a load is applied to the device, and a means for increasing the speed droop when a lower reference speed is selected using the reference speed selecting means.

The speed governor also includes a means for comparing the pulsed speed signal with the pulsed reference signal, and for generating a pulsed error signal that preferably has a pulse width that is functionally related to a difference between the speed signal pulse width and the reference signal pulse width. A changing means changes the speed of the device as a function of the error signal.

The means for generating a pulsed reference signal may also include a means for determining the magnitude of a load applied to the device, such that the speed droop increasing means also increases the speed droop as the magnitude of the load is increased. In a preferred embodiment, the load determining means includes a variable resistor, such as a potentiometer, interconnected with the engine throttle. Also in a preferred embodiment, the reference speed selecting means includes a variable resistor such as a potentiometer. The comparison means may include an exclusive OR gate or a microprocessor. The speed governor may also include a means for limiting the changing of the device speed when the width of the error signal pulse is less than a predetermined threshold value.

In another aspect, the speed governor comprises an input means for receiving a periodic signal indicative of the actual speed of the device, a first means for generating a pulsed speed signal that is functionally related to the periodic signal, the pulsed speed signal preferably having a pulse width that is functionally related to the actual speed. The speed governor also includes a comparison means having a first input that receives the pulsed speed signal and having a second input that receives a pulsed reference speed signal. The comparison means compares the pulsed speed signal with the pulsed reference signal, and then generates a pulsed error signal that preferably has a pulse width that is functionally related to a difference between the speed signal pulse and the reference signal pulse.

In this aspect, the speed governor also includes: a means for determining the pulsed reference speed signal, including a timing circuit having an output in circuit connection with the second input of the comparison means; a first variable resistor or potentiometer in circuit connection with the timer input that selects a reference speed; a second variable resistor or potentiometer in circuit connection with the second input, that outputs a signal functionally related to a load applied to the device; and a means for changing the speed of the device as a function of the error signal. In other words, the determining means determines the width of the reference speed signal pulse as a function of the selected reference speed and also as a function of the load applied to the device. This is accomplished in an inexpensive way having a reduced number of components.

The speed governor may be used to control the speed of an internal combustion engine which has a variable speed selection feature. In that case, the speed governor would include a reversible DC motor controlled by a bridge network of transistors to move an engine throttle, thereby adjusting the engine speed. The electronic governor could also be used to control a fuel injection system instead of carburetor throttle plate position.

Additional features and advantages of the present invention will be apparent to those skilled in the art from the following detailed description of the preferred embodiment and the drawings, in which:

BRIEF DESCRIPTION OF THE DRAWINGS

FIG. 2 is a schematic diagram of the pulsed reference signal determining means according to the present invention.

FIGS. 3 through 6 are equivalent circuits to the circuit of FIG. 2, at different speed and load conditions.

FIG. 3 depicts the pulsed reference signal determining means at a high speed, no load condition.

FIG. 4 depicts the determining means at a high speed, high load condition.

FIG. 5 depicts the pulsed reference signal determining means at a low speed, no load condition.

FIG. 6 depicts the determining means at a low speed, high load condition.

FIGS. 7 through 11 are timing diagrams related to the circuit of FIG. 1 when the device is in an underspeed condition.

FIG. 7 depicts the periodic input signal.

FIG. 8 depicts the pulsed speed signal for an underspeed condition.

FIG. 9 depicts the pulsed reference signal.

FIG. 10 depicts the pulsed error signal, which corresponds to the difference in pulse width between the pulsed speed signal and the pulsed reference signal.

FIG. 11 depicts the current flowing through the motor as a function of the error signal.

DETAILED DESCRIPTION

Figure 1:
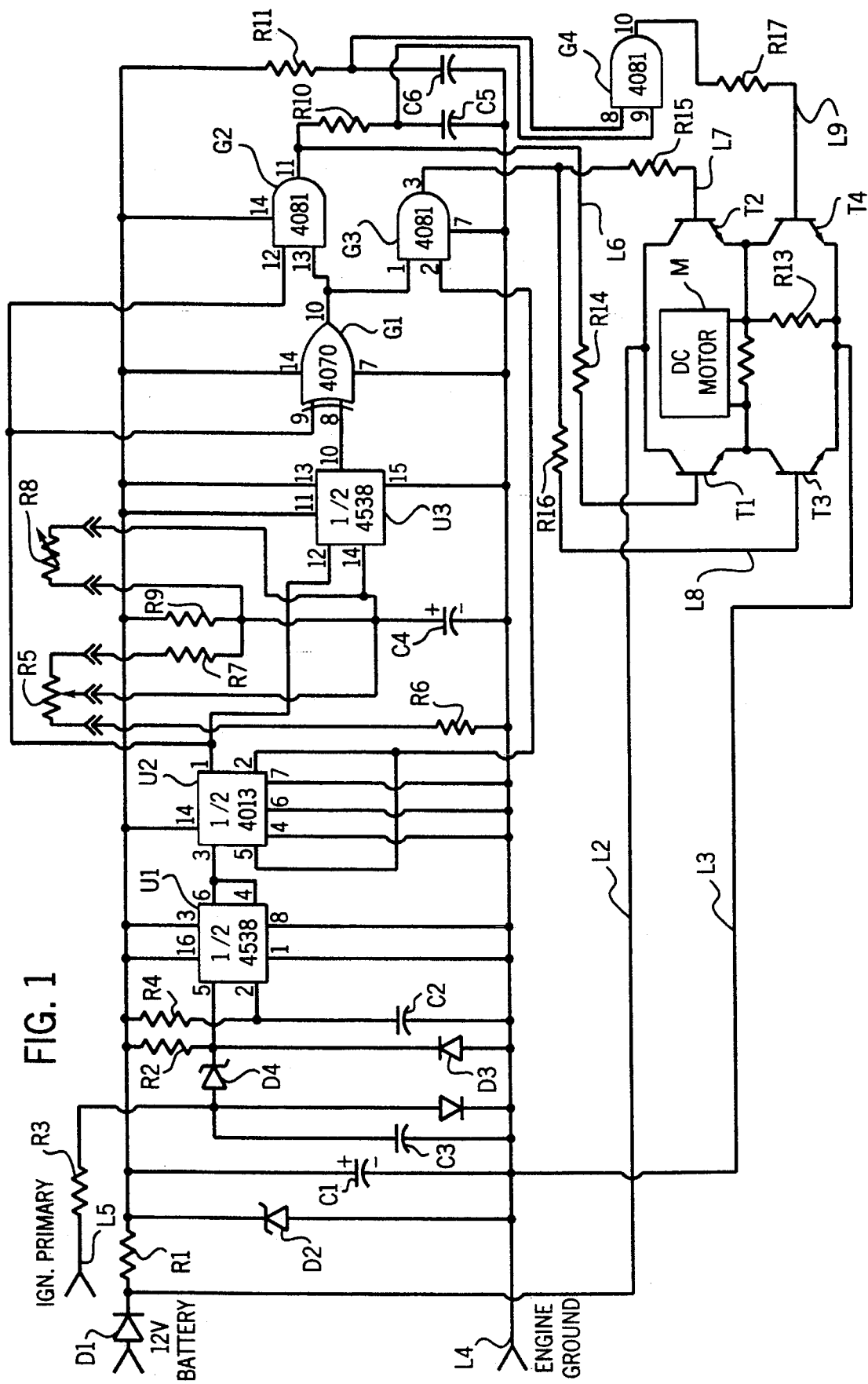
FIG. 1 is a schematic diagram of a preferred embodiment of the present invention.

FIG. 1 is a schematic diagram of a preferred embodiment of the present invention. In FIG. 1, the system components are provided with 12 VDC power on line L1 through a diode D1 and a resistor R1. Diode D1 protects the electronic governor control circuitry from improper battery connection. Resistor R1 limits the surge current through capacitor C1. Zener diode D2 limits circuit voltage by clamping voltage spikes. Resistor R1 and capacitor C1 together filter out ripple from the 12 VDC power supply.

12 VDC power is provided to DC motor M through line L2, with line L3 being connected to engine ground L4.

Although FIG. 1 depicts the electronic governor components being powered by a 12 volt battery, it will be understood by those skilled in the art that the circuit components may be powered by a smooth, rectified signal from an AC source, such as a coil, as described in U.S. patent application Ser. No. 08/228,288, filed Apr. 15, 1994, now U.S. Pat. No. 5,520,588 which is incorporated by reference herein.

The alternating periodic signal from the ignition primary is sensed on line L5. Resistor R2 is a pull-up resistor which keeps pin 5 of timer U1 at a high state. Timer U1 is one-half-of a 4538 timer. When the alternating ignition primary signal on line L5 goes negative, the ignition current goes from engine ground on line L4 through diode D3, through zener diode D4 and through the resistor R3, thereby bringing pin 5 of timer U1 to a low state to start the timer. The RC timing circuit consisting of resistor R4 and capacitor C2 determine the time constant-for timer U1. Capacitor C3 filters out RFI noise.

The receipt of a periodic signal by timer U1 starts its timing cycle. The output of timer U1 at pin 6 thereof is a rectangular-wave signal whose pulse width is greater than the length of a periodic input signal from the ignition primary winding on line L5 at normal engine operating speeds. Thus, timer U1 creates a one pulse per engine revolution signal.

The output of timer U1 is provided to the pin 3 input of a divide-by-two circuit U2. The function of device U2 is to provide a rectangular-wave signal whose pulse width is functionally related to the actual engine speed.

The output of device U2 is provided to input pin 12 of timer U3, which is the other half of the 4538 timer. The time constant of timer U3 is determined by the RC timing circuit consisting of capacitor C4, reference speed potentiometer R5, resistors R6 and R7, a load feedback potentiometer R8, and resistor R9.

The output on pin 1 of device U2 is also provided to input pin 9 of an exclusive OR gate G1, as well as to input pin 12 of AND gate G2. The output of timer U3 at its pin 10 is provided to input pin 8 of gate G1.

The output of exclusive OR gate G1 is provided to pin 13 of AND gate G2 as well as to pin 1 of a second AND gate G3. The inverted output on pin 2 of divide-by-two U2 is provided to input pin 2 of AND gate G3.

The output of gate G2 is provided via line L6 through a resistor R14 to the base of transistor T1, as well as to pin 9 of AND gate G4. Pin 8 of gate G4 is connected to the 12 VDC power source.

The output of AND gate G3 is provided via line L7 through a resistor R15 to the base of a transistor T2, as well as to the base of transistor T3 via line L8 and through a resistor R16. The output of AND gate G4 is provided via line L9, through a resistor R17, and to the base of a transistor T4.

Exclusive OR gate G1 is used to compare the pulsed speed signal output by device U2 with the pulsed reference signal output by timer U3. When the pulsed speed signal is not equal to the pulse reference signal, the output of gate G1 goes to a high-state, with the pulse width of this error signal being proportional to the difference between the actual engine speed and the reference speed.

Both inputs to gate G2 are at a high-state during an underspeed condition, so that the output of gate G2 and the output of gate G4 are also at a high-state in an underspeed condition. In that event, transistors T1 and T4 are turned ON to provide motor current to motor M in a first direction so as to partially open the engine throttle or to control an engine's fuel-injection system.

In an overspeed condition, the output of gate G1 is high while the output of divide-by-two U2 on pin 1 is low, so that the output of gate G2 is also low. Since no high-state control signal is output by gate G2 in an overspeed condition, transistors T1 and T4 are not turned ON.

Referring now to AND gate G3, in an underspeed condition the output of gate G1 will be high when the inverted output of device U2 provided on its pin 2 to pin 2 of gate G3 is at its low-state. Thus, the output of AND gate G3 is at its low-state in an underspeed condition, so that no high-state control signal is provided to transistors T2 and T3. Thus, transistors T2 and T3 do not conduct in an underspeed condition.

In an overspeed condition, the output of AND gate G3 at its high-state since the output of gate G1 and the inverted output of device U2 on its pin 2 are both in their high-state at the same time. In the overspeed condition, gate G3 outputs a high state control signal to turn ON transistors T2 and T3. Motor current is thus provided to motor M, and the engine throttle is at least partially closed to reduce the engine speed.

The response of the governor to an underspeed condition is delayed during engine warm-up. The circuit which achieves this function consists of AND gate G4, resistor R11, and capacitor C6. During engine warm-up, the input to pin 8 of gate G4 remains at its low-state until capacitor C6 is sufficiently charged through resistor R11. When pin 8 of gate G4 is low, the output of gate G4 ! remains low, so that transistor T4 does not conduct. However, some motor current is still provided to motor M through transistor T1 and resistor R13. When capacitor C6 becomes sufficiently charged, pin 8 of gate G4 goes high. When the input at pin 9 of gate G4 is also high, which occurs in an underspeed condition, the output of gate G4 is controlled by gate G2, so that the conduction of transistor T4 is controlled by gate G2 in the usual manner.

When the actual engine speed is slightly below the reference speed, the amplitude of the control signal is limited to prevent unnecessary cycling of the engine. When the actual engine speed is slightly less than the reference speed, the output at pin 11 of AND gate G2 goes high. Capacitor C5 is then charged through resistor R10, keeping pin 9 of gate G4 low until capacitor C5 is sufficiently charged. Transistor T4 is prevented from conducting until capacitor C5 becomes sufficiently charged, since the output of gate G4 is in its low-state and no high-state control signal is generated to transistor T4. After a short time delay, capacitor C5 becomes sufficiently charged, so that pin 9 of gate G4 goes to its high-state. Since pin 8 of gate 4 is also at its high-state after engine warm-up, the output of AND gate G4 then goes to its high-state, thereby turning ON transistor T4. Transistor T1 is also turned ON at the same time since the output of AND gate G2 is also high. Thus, current flows through motor M to rotate the shaft of the motor, thereby partially opening the engine throttle.

The RC timing circuit which determines the timing constant for timer U3 incorporates several key features of the present invention. This timing circuit consists of reference speed potentiometer R5, resistors R6 and R7, load feedback potentiometer R8, resistor R9, and capacitor C4. These key features of the present invention include the following:

(i) The ability to change the time constant as a function of a selected reference speed.

(ii) The ability to change the time constant as a function of load feedback, e.g. throttle opening.

(iii) The ability to introduce speed droop when a load is applied.

(iv) The ability to vary the speed droop as a function of the applied load.

(v) The ability to vary the speed droop as a function of the selected reference speed.

FIG. 2 depicts an equivalent circuit to the RC timing circuit for timer U3. FIG. 2, as well as FIG. 3 through 6, contain samples values for components of the RC timing circuit. As shown in FIG. 2, the 25k$\Omega$ reference speed potentiometer R5 is connected in parallel across load feedback potentiometer R8.

The time constant of the RC circuit is dependent upon the interplay of several of its components, including the following:

1. The effective resistance connected in parallel across load feedback resistor R8. This effective resistance is determined by the position of wiper W1 of potentiometer R5. As wiper W1 moves down to set a lower reference speed, the parallel resistance across load potentiometer R8 is increased, resulting in increased total resistance of the RC circuit. As a result, the time constant of the RC circuit increases with lower selected reference speed.

2. The increase in load at, for example, wide open throttle, increases the resistance of load potentiometer R8, which also tends to lengthen the RC time constant and lower the reference speed. As a result, speed droop is increased as the load is increased.

3. Lowering the resistance across capacitor C4 at lower selected reference speeds, also accomplished by moving wiper W1, also tends to lengthen the time constant since it takes longer for the capacitor to charge up to the threshold voltage of timer U3.

4. As the selected reference speed decreases, the contribution of the load feedback potentiometer resistance to the total resistance of the RC timing circuit is increased, thereby increasing the effect of the load potentiometer resistance at lower speeds. As a result, the speed droop increases at lower reference speeds.

The operation of the RC timing circuit will be discussed in connection with FIGS. 3 through 6.

FIGS. 3 and 4 depict the equivalent RC timing circuit when the wiper of the reference speed potentiometer is at its uppermost position, that is, when the reference speed is set at its upper limit. FIG. 3 depicts the circuit when the throttle is substantially closed, as when a no load condition exists. FIG. 4 depicts the circuit when a maximum load is applied to the engine, so the throttle is at its wide open position.

In FIG. 3, the resistance across load potentiometer R8 is relatively low, equaling only the resistance of resistor R7. This reduced parallel resistance tends to shorten the timing constant of the RC timing circuit, thereby tending to increase the reference speed. At the same time, a relatively high resistance, 35k ohms, is placed across capacitor C4. This high resistance allows the capacitor to charge faster, thereby reducing the RC time constant. Also, the effective resistance of load feedback potentiometer R8 is relatively low, 1.5k ohms. The result of these resistances as depicted in FIG. 3 is a reference speed of about 3,375 rpm when no load is applied.

FIG. 4 is the same as FIG. 3, except that the relative resistance of load feedback potentiometer R8 is now at its upper limit because the throttle is wide open. As a result, the reference speed in the wide open throttle position is about 3,025 rpm, so that the speed droop is equal to 3,375 minus 3,025 or 350 rpm. In other words, the speed droop when the reference speed is at its maximum, and a full load is applied, is about 350 rpm.

FIGS. 5 and 6 depict the equivalent RC timing circuit when the selected reference speed is at the lower limit of potentiometer R5. In both FIGS. 5 and 6, the effective parallel resistances R5, R7 across load feedback potentiometer R8 is relatively high, 29k ohms. The effect of this high parallel resistance is to increase the total resistance in the RC timing circuit. As a result, the time constant of the RC circuit increases with lower selected reference speed, thereby lowering the reference speed.

In both FIGS. 5 and 6, the resistance across capacitor C4 is a relatively low 10k ohms. As a result, it will take longer for the capacitor to charge up to the threshold voltage of timer U3, thereby tending to decrease the reference speed. The contribution of load feedback resistor R8 to total RC circuit resistance is greater at lower engine speeds, thereby increasing the speed droop at lower reference speeds.

In FIG. 5, the load feedback resistance is relatively low under no load conditions, but is higher in FIG. 6 under full load conditions.

In FIG. 5, the total resistance of the RC timing circuit results in a reference speed of approximately 1,800 rpm at closed throttle (no load) conditions. At wide open throttle or maximum load conditions, the reference speed is approximately 1,175 rpm, yielding a speed droop of 625 rpm. It is thus apparent that the speed droop at the lower reference speed described in connection with FIG. 6 is substantially greater than the speed droop at the higher reference speed described in connection with FIG. 4.

Although FIGS. 1 through 6 depict and describe the use of an RC timing circuit to change the timing constant of the timer, other means could be used to accomplish a substantially similar result. Instead of changing the timing constant, for example, a 555 or a 556 timer could be used having selectable threshold values; a different threshold value would be selected depending on the position of the wiper of the reference speed potentiometer.

Another approach would be to program a microprocessor to vary the speed droop as a function of the selected reference speed and also as a function of the applied load.

A key feature of the present invention is that a single manually-operable control is used to both select the reference speed and to vary the speed droop as a function of the reference speed. This is accomplished by the unique connection of the reference speed potentiometer in parallel across the load feedback resistance as well as in parallel across the timing capacitor. Both sides of the reference speed potentiometer are used in the present invention: the resistance of the potentiometer above the wiper is connected across the load feedback resistance, while the portion of the potentiometer below the wiper is connected across the timing capacitor.

The present invention may be used in any application where a variety of reference speeds may selected. One particularly suitable application would be a tractor engine.

Figure 12:
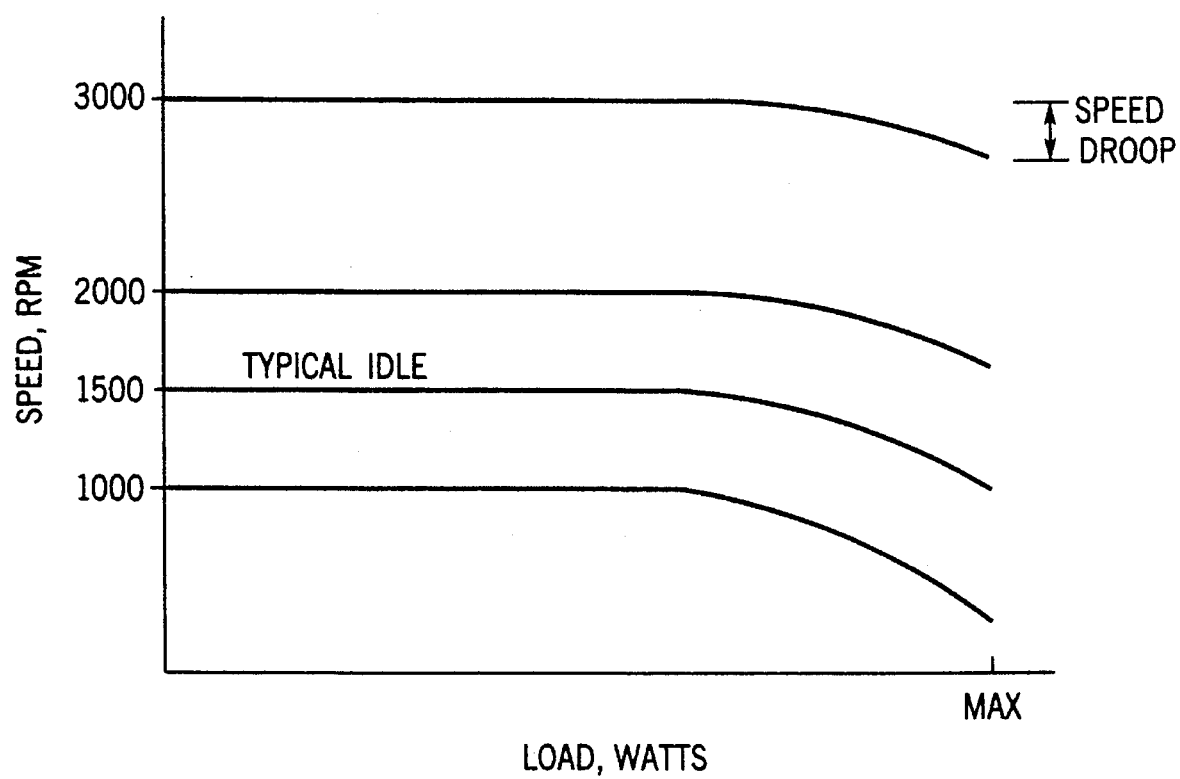
FIG. 12 is a graph of device speed versus load depicting the increase in speed droop as the reference speed is decreased and as the load is increased.

FIG. 12 is a graph of engine speed versus load. As shown in FIG. 12, engine droop when the selected reference speed is 3,000 rpm is substantially less than when the selected speed is a typical idle speed of 1,500 rpm. Indeed, the speed droop is increased as the selected reference speed is decreased.

FIGS. 7 through 11 are timing diagrams relating to a schematic diagram of FIG. 1. FIG. 7 depicts the periodic ignition primary signal input on line L5 in FIG. 1.

FIG. 8 depicts a pulsed speed signal corresponding to the actual engine speed in an underspeed condition. FIG. 8 corresponds to the output of divide-by-two U2. By comparing FIGS. 7 and 8, it is apparent that the pulse width of the speed signal is equal to the time duration between the onset of successive periodic signals. The speed signal changes state at the onset of each periodic signal, so that the pulse width of both the high-state and low-state of the pulsed speed signal are a function of the actual speed of the device. The speed of the device is readily determined from the time between the onset of successive periodic signals, since one periodic signal is generated for each revolution of the engine flywheel.

FIG. 9 depicts the pulsed reference signal as output by timer U3. FIG. 10 depicts the error signal output by exclusive OR gate G1, which corresponds to the difference between the pulse widths of the speed signal in FIG. 8 and the reference signal in FIG. 9. The error signal for an underspeed signal is depicted in FIG. 10, and corresponds to the output signal generated by gate G1. Finally, FIG. 11 depicts the motor current to motor M to correct the underspeed condition.

While the preferred embodiment of the present invention has been shown and described, alternate embodiments will be apparent to those skilled in the art and are within the intended scope of the present invention. For example, the governor could be implemented using a microprocessor, or using frequency modulation instead of pulse width modulation. Therefore, the invention is to be only limited by the following claims.

We claim:

1. A speed governor that controls the actual speed of a device, comprising:
   input means for receiving a periodic signal indicative of the actual speed of the device;
   first means for generating a pulsed speed signal that is functionally related to said periodic signal;
   second means for generating a pulsed reference signal, including
      means for selecting a reference speed for said device;
      means for reducing said reference speed by a speed droop to yield a new reference speed when a load is applied to said device;
   means for increasing said speed droop when a lower reference speed is selected using said selecting means;
   means for comparing said pulsed speed signal with said pulsed reference signal, and for generating a pulsed error signal that is functionally related to a difference between said speed signal and said reference signal; and
   means for changing the speed of the device as a function of said error signal.

2. The speed governor of claim 1, wherein said second generating means also comprises:
   means for determining the magnitude of a load applied to said device; and
   wherein said speed droop increasing means also increases said speed droop as the magnitude of said load is increased.

3. The speed governor of claim 2, wherein said load determining means includes a variable resistor.

4. The speed governor of claim 1, wherein said speed selecting means includes a variable resistor, and wherein said speed droop increasing means also includes said variable resistor.

5. The speed governor of claim 2, wherein said reference speed selecting means includes a first variable resistor, wherein said load magnitude determining means includes a second variable resistor, and wherein said second generating means includes a timer having an input, each of said first and second variable resistors being connected in circuit with said timer input.

6. The speed governor of claim 5, wherein said speed droop increasing means includes a resistor-capacitor timing circuit connected in circuit with said timer input, and wherein said first variable resistor is connected in circuit across said capacitor to change the time constant of said RC timing circuit.

7. The speed governor of claim 6, wherein said first variable resistor is connected in circuit with said second variable resistor such that said first variable resistor changes the proportion of the resistance of said second variable resistance to the total resistance of said load determining means.

8. The speed governor of claim 1, wherein said comparison means includes an exclusive OR gate.

9. The speed governor of claim 1, wherein said first generating means includes a divide-by-two device.

10. The speed governor of claim 1, wherein said speed changing means includes a reversible DC motor.

11. The speed governor of claim 10, wherein said speed changing means also includes a bridge network that determines the amount of rotation of said DC motor as a function of said error signal.

12. The speed governor of claim 10, wherein said reversible motor is interconnected with a throttle of an internal combustion engine.

13. The speed governor of claim 1, wherein said device is an internal combustion engine having a coil that generates said periodic signal.

14. A speed governor that controls the actual speed of a device, comprising:
input means for receiving a periodic signal indicative of the actual speed of the device;
first means for generating a pulsed speed signal that is functionally related to said periodic signal;
means for determining a pulsed reference speed signal functionally related to a reference speed, including
a timing circuit having an input;
a first variable resistor, in circuit connection with said timing circuit input, that selects a reference speed;
a second variable resistor, in circuit connection with said timing circuit input, that outputs a signal functionally related to a load applied to said device;
a comparison means having a first input that receives said pulsed speed signal and having a second input that receives said pulsed reference speed signal, said comparison means for comparing said pulsed speed signal with said pulsed reference signal and for generating a pulsed error signal that is functionally related to a difference between said speed signal and said reference signal; and
means for changing the speed of said device as a function of said error signal.

15. The speed governor of claim 14, wherein said determining means includes a timing resistor and a capacitor connected as a RC timing circuit to the input of said first timing circuit, and wherein said first variable resistor is connected across said capacitor such that said first variable resistor varies the resistance across said capacitor to change the time constant of said RC timing circuit.

16. The speed governor of claim 15, wherein said first variable resistor is connected in circuit with said second variable resistor such that said first variable resistor changes the proportion of the resistance of said second variable resistance to the total resistance of said determining means.

17. The speed governor of claim 14, wherein said comparison means includes an exclusive OR gate.

18. The speed governor of claim 14, wherein said first generating means includes a divide-by-two device.

19. The speed governor of claim 14, wherein said speed changing means includes a reversible motor.

20. The speed governor of claim 19, wherein said speed changing means also includes a bridge network that determines the amount of rotation of said DC motor as a function of said error signal.

21. The speed governor of claim 19, wherein said reversible motor is interconnected with a throttle of an internal combustion engine.

22. The speed governor of claim 14, wherein said device is an internal combustion engine having a coil that generates said periodic signal.

23. A speed governor that controls the actual speed of a device, comprising:
input means for receiving a periodic signal indicative of the actual speed of the device;
first means for generating a pulsed speed signal that is functionally related to said periodic signal;
second means for generating a pulsed reference signal that is functionally related to a reference speed, including a manually-operable control that both selects said reference speed and that varies a speed droop as a function of said reference speed;
means for comparing said pulsed speed signal with said pulsed reference signal, and for generating a pulsed error signal that is functionally related to a difference between said pulsed speed signal pulse and said reference signal pulse; and
means for changing the speed of the device as a function of said error signal.

24. The speed governor of claim 23, wherein said manually-operable control includes a variable resistor.

25. The speed governor of claim 23, wherein said second generating means also includes a timer that receives a signal from said control.

* * * * *